United States Patent
Bell et al.

(10) Patent No.: US 12,196,155 B2
(45) Date of Patent: Jan. 14, 2025

(54) FLAMELESS COMBO HEATER

(71) Applicant: ConleyMax Inc., Calgary (CA)

(72) Inventors: Patrick G. Bell, Calgary (CA); William N. Beckie, Calgary (CA)

(73) Assignee: ConleyMax Inc., Calgary (CA)

( * ) Notice: Subject to any disclaimer, the term of this patent is extended or adjusted under 35 U.S.C. 154(b) by 0 days.

(21) Appl. No.: 17/551,430

(22) Filed: Dec. 15, 2021

(65) Prior Publication Data

US 2022/0145827 A1    May 12, 2022

Related U.S. Application Data

(63) Continuation of application No. 16/600,900, filed on Oct. 14, 2019, now Pat. No. 11,230,993, which is a continuation of application No. 13/834,942, filed on Mar. 15, 2013, now Pat. No. 10,495,025.

(51) Int. Cl.
| | |
|---|---|
| *F24D 15/02* | (2006.01) |
| *B60H 1/03* | (2006.01) |
| *F02G 5/00* | (2006.01) |
| *F02G 5/04* | (2006.01) |
| *F24H 6/00* | (2022.01) |

(Continued)

(52) U.S. Cl.
CPC ............... *F02G 5/00* (2013.01); *B60H 1/038* (2013.01); *F02G 5/04* (2013.01); *F24D 15/02* (2013.01); *F24H 6/00* (2013.01); *F24V 40/00* (2018.05); *B60H 2001/146* (2013.01); *F02G 2260/00* (2013.01); *F24D 2200/18* (2013.01); *F24D 2200/26* (2013.01); *F24D 2200/30* (2013.01); *Y02T 10/12* (2013.01)

(58) Field of Classification Search
CPC ........................................................ F24V 40/00
See application file for complete search history.

(56) References Cited

U.S. PATENT DOCUMENTS

| | | |
|---|---|---|
| 4,264,826 A | 4/1981 | Ullman et al. |
| 4,385,594 A | 5/1983 | Hauser, Jr. et al. |
| 4,680,975 A | 7/1987 | Dodt |

(Continued)

FOREIGN PATENT DOCUMENTS

| | | |
|---|---|---|
| CA | 2741507 A1 | 9/2012 |
| CA | 2811829 A1 | 7/2014 |
| JP | 10-175419 A | 6/1998 |

OTHER PUBLICATIONS

Extended (Supplementary) European Search Report dated Nov. 4, 2016, issued in European Patent Application No. 14762281.5 (8 pages).

(Continued)

*Primary Examiner* — Edelmira Bosques
*Assistant Examiner* — Deepak A Deean
(74) *Attorney, Agent, or Firm* — HEA Law PLLC; Darrin A. Auito

(57) ABSTRACT

A dual heating process is performed in the absence of an open flame. Heat is created by a rotating prime mover(s) driving a fluid shear heater. Heat is also collected from a cooling system of the prime mover, and from any exhaust heat generated by the prime mover. The heat energy collected from all of these sources is transmitted through heat exchangers to a fluid where heat energy is desired. The fluid being heated may be glycol or air, depending on the type of heat desired.

20 Claims, 1 Drawing Sheet

(51) Int. Cl.
*F24V 40/00* (2018.01)
*B60H 1/14* (2006.01)

(56) References Cited

U.S. PATENT DOCUMENTS

| | | | |
|---|---|---|---|
| 4,881,495 | A | 11/1989 | Tomare et al. |
| 5,098,036 | A | 3/1992 | Brigham et al. |
| 5,190,249 | A | 3/1993 | Whitmire et al. |
| 5,222,696 | A * | 6/1993 | Brigham .................. B64F 5/23 244/134 R |
| 5,709,201 | A | 1/1998 | Puett, Jr. |
| 6,761,135 | B1 * | 7/2004 | Becktold ................. B08B 3/026 237/19 |
| 6,883,467 | B2 | 4/2005 | Holden |
| 7,337,828 | B2 | 3/2008 | Lange |
| 7,424,916 | B2 | 9/2008 | Foster et al. |
| 7,614,367 | B1 | 11/2009 | Frick |
| 7,637,232 | B2 | 12/2009 | Foster |
| 7,766,077 | B2 | 8/2010 | Masters et al. |
| 7,866,380 | B2 | 1/2011 | Masters et al. |
| 8,291,868 | B2 | 10/2012 | Whallon |
| 8,469,283 | B2 | 6/2013 | Sanger et al. |
| 8,484,963 | B2 | 7/2013 | Jackson et al. |
| 9,228,760 | B2 | 1/2016 | Welle et al. |
| 11,230,993 | B2 * | 1/2022 | Bell .......................... F24H 6/00 |
| 2004/0144200 | A1 | 7/2004 | Giordano et al. |
| 2005/0121532 | A1 | 6/2005 | Reale et al. |
| 2006/0185621 | A1 | 8/2006 | Foster et al. |
| 2006/0260788 | A1 | 11/2006 | Masters et al. |
| 2007/0261823 | A1 | 11/2007 | Masters et al. |
| 2008/0185453 | A1 | 8/2008 | Sanger et al. |
| 2010/0006668 | A1 | 1/2010 | Alexander |
| 2010/0013957 | A1 | 6/2010 | Whallon |
| 2010/0192875 | A1 | 8/2010 | Frick et al. |
| 2011/0005757 | A1 | 1/2011 | Herbert |
| 2011/0036418 | A1 | 2/2011 | Hendy |
| 2011/0079561 | A1 | 4/2011 | Masters et al. |
| 2011/0120427 | A1 | 5/2011 | Andersson et al. |
| 2011/0185713 | A1 * | 8/2011 | Koopmann ............... F24H 3/06 165/104.19 |
| 2012/0048717 | A1 * | 3/2012 | Frick ........................ F22B 3/06 203/22 |
| 2012/0174987 | A1 | 7/2012 | Crawford et al. |
| 2013/0270352 | A1 | 10/2013 | Roth et al. |
| 2013/0284817 | A1 * | 10/2013 | Welle ................. B60H 1/00314 237/12.1 |
| 2014/0174691 | A1 | 6/2014 | Kamps et al. |
| 2014/0209281 | A1 | 7/2014 | Kamps et al. |

OTHER PUBLICATIONS

Int'l Preliminary Report on Patentability (Form PCT/IB/373) issued in Int'l App. No. PCT/CA2014/050285 dated Sep. 15, 2015, with Form PCT/ISA/237 (6 pages).

The Written Opinion of Int'l Searching Authority Int'l App. No. PCT/CA2014/050919 dated Dec. 9, 2014 with Form PCT/ISA/237 (5 pages).

Int'l Search Report (ISR) dated Dec. 9, 2014, issued in Int'l App. No. PCT/CA/2014/050919 (3 pages).

Written Opinion dated Jun. 9, 2014 issued in Int'l App. No. PCT/CA2014/050286.

Int'l Search Report (ISR) of PCT/CA2014/050286 dated Jun. 9, 2014.

* cited by examiner

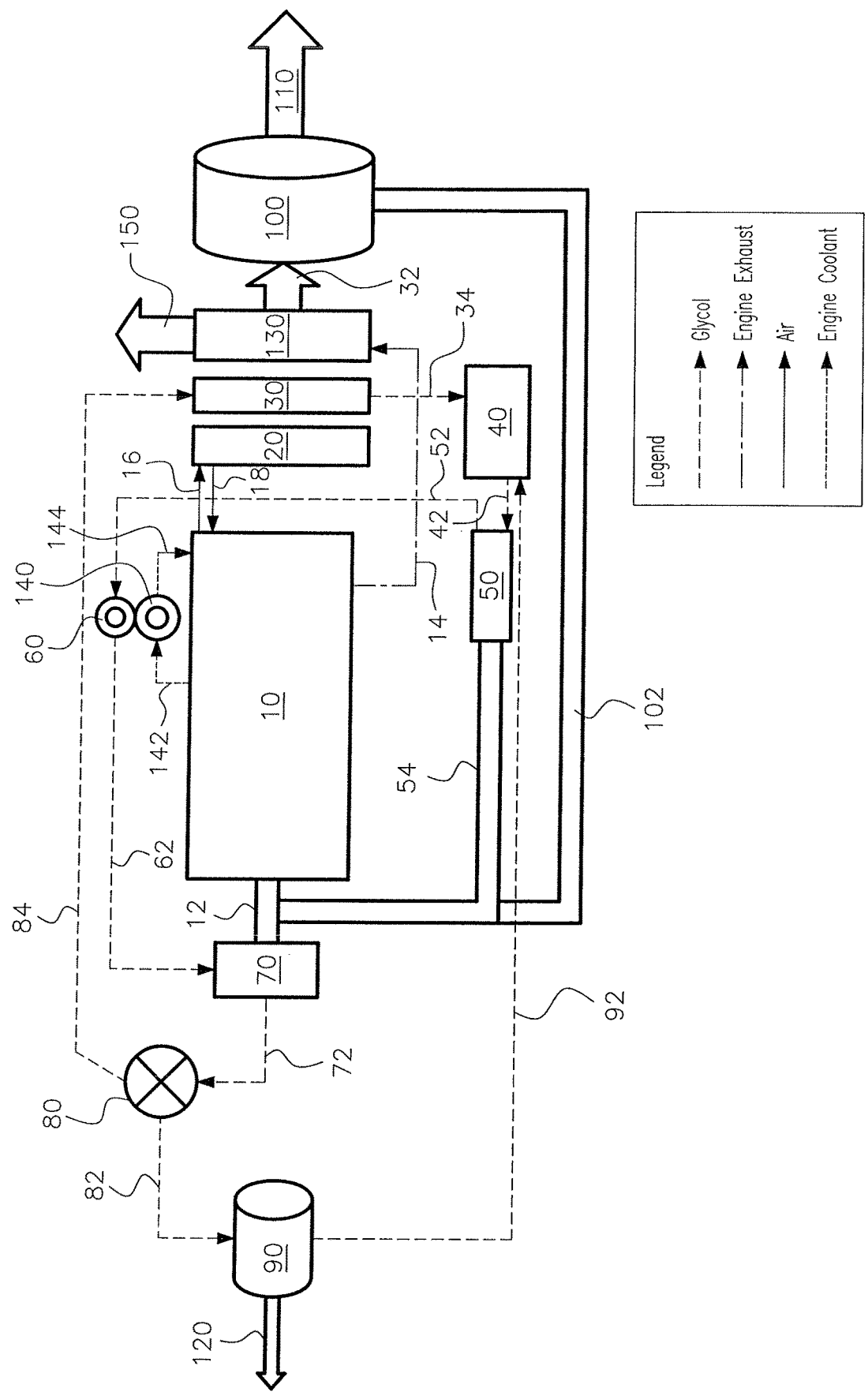

FLAMELESS COMBO HEATER

CROSS-REFERENCE TO RELATED APPLICATIONS

This application claims priority to and is a continuation application of pending U.S. application Ser. No. 16/600,900 filed Oct. 14, 2019, which is a continuation application of U.S. application Ser. No. 13,834,942 filed on Mar. 15, 2013 (now U.S. Pat. No. 10,495,025 issued Dec. 12, 2019). The contents of the above are incorporated herein by reference in its entirety.

FIELD OF THE INVENTION

The present invention generally relates to processes used to provide heat for industrial processes, where the heating process does not require an open flame.

BACKGROUND OF THE INVENTION

Industrial applications may require warm air and fluid heating capabilities of various types to avoid freezing and provide a safe, comfortable work environment. Specific environments may require that no open flame be present. This most commonly occurs in the energy industry. The present invention was created to heat air and fluids in these environments.

The present invention allows the opportunity to eliminate inefficient, labor intensive, and hazardous boilers, heat fluids contained in various tanks, thaw ground or other strata, and provide warm air in various applications. This process provides warm air and glycol at user specified ratios, and can be combined with a variety of heat exchangers to transmit the heat to a desired location. The heating process is efficient and safe, making the best use of fuel in a flameless environment.

SUMMARY OF THE INVENTION

The present invention consists of a number of major components which are connected in such a way that the process provides efficient, flameless heat. The components are generally trailer mounted, but may also be truck or skid mounted.

The largest component is the prime mover. The prime mover is most often a diesel engine, gasoline engine or natural gas engine. An electric drive may also be used depending on the environmental considerations.

Connected directly to the drive shaft of the prime mover is a dynamic heater, such as a fluid shear heater. This component utilizes the majority of the power available from the prime mover, and converts this energy into heat. The heater shears a heater fluid, typically glycol. This glycol is contained in a separate system, and may be heated by engine coolant, circulate through a heating hose, or to a liquid to air heat exchanger, or radiator, to provide warm air.

Also connected to the drive of the prime mover is a centrifugal pump to move the glycol through the system. This system includes a heating hose, and reel for the heating hose. The hose may be extended from the unit to provide heat at equipment several feet from the heating unit.

A fan, which may be driven by the prime mover, is utilized to move warm air through external ductwork to provide heat to equipment and/or personnel.

The remaining major components to the system are heat exchangers. One heat exchanger is a liquid to liquid heat exchanger which transfers heat from the engine coolant to the heating glycol. The remainder of the heat exchangers may be liquid to air or liquid to liquid, depending on if more air heat is required or more glycol heat is required. On some specific engines, an intercooler air to air heat exchanger may also be present.

Other system components include a fuel tank to operate the engine, a glycol reservoir, a trailer to house the components, and a control system to maintain operation of the system and alarm in the event of a mechanical failure.

These and other objects of the invention, as well as many of the intended advantages thereof, will become more readily apparent when reference is made to the following description taken in conjunction with the accompanying drawing.

BRIEF DESCRIPTION OF THE DRAWINGS

The following drawings illustrate examples of various components of the invention disclosed herein, and are for illustrative purposes only. Other embodiments that are substantially similar can use other components that have a different appearance.

The Figure schematically illustrates the production of heated glycol and/or heated air.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Reference will now be made to the Figure for a more detailed description of the flameless glycol/air combination heater. A review of the components and then the process of the combination glycol and air heater will follow.

The purpose of this invention is to provide either hot glycol or hot air, or both, in whatever proportion that the operator desires. This means that the operator can have most of the heat generated by this machine as hot glycol or as hot air or a combination of either by simply moving a lever.

The first main component is the prime mover 10, which can be either a diesel, gas, propane or natural gas fueled engine. A prototype and a second generation model have used an air cooled intercooler, but could have a glycol cooled intercooler or no intercooler at all. The prime mover also has glycol/engine coolant heat exchanger portions 60, 140 to keep the engine running within its ideal temperature range.

Attached to the prime mover by a splined output shaft 12 is a dynamic heater 70, which is a fluid shear heater. The majority of the engine horsepower is used to shear a heating fluid in the glycol heater, which in this case is an environmentally friendly glycol. The heating fluid can be any fluid that is practical to be used in an oilfield environment. It should be environmentally friendly as well as non-combustible and be commonly used in oilfield applications. Heating fluids used in this application include oil and glycol.

The fluid shear heater 70 can use either metal plates moving across each other, spinning discs or pumping fluids through orifices to create fluid shear forces large enough to generate heat. The majority of the power generated by the engine is used for the purpose of shearing fluid to generate heat. The fluid shear heater is bolted directly to the engine and is powered by the splined output shaft 12 of the engine 10.

Between the engine and fluid shear heater is a torsional vibration dampener (not shown), which is used to smooth out the vibrations created by the prime mover 10. The use of a torsional vibration dampener extends the life of the splined output shaft 12 and the fluid shear heater 70. For the purpose of this application, glycol will be referred to as the heater fluid, but as mentioned before many other fluids could be used as well.

A glycol pump 50 driven off of drive shaft 12 by shaft 54 is used to pump glycol heating fluid throughout the system. Pump 50 must be capable of pumping glycol at temperatures of up to approximately 200° F. (100° C.).

Air/air intercooler 20 is a standard air to air intercooler as used in trucks and heavy machinery to cool compressed air from pipe 16 and return cooled air to engine 10 by pipe 18.

Radiator 30 is a standard radiator used in automotive applications. Radiator 30 is used to dissipate heat from glycol or similar fluids using air as the cooling medium.

Exhaust heat exchanger 130 is an air to air heat exchanger. It is sized so that the incoming engine exhaust from pipeline 14 at up to 700° F. (400° C.) can be cooled down to 70° F. (20°-25° C.) and released by outlet 150.

Air fan 100 is a centrifugal fan sized for the amount of air required by the operator and to utilize the heat in the engine exhaust as moved through pipeline 14 to exhaust heat exchanger 130. Cooled exhaust air is released through outlet 150. Additional heated air is provided by intercooler 20 and radiator 30.

Glycol/air valve 80 is a variable control valve that is used to vary the amount of glycol passed between radiator 30 and glycol hose 90. Glycol hose 90 is mounted on a reel that contains two lengths of hose, which are capable of transporting hot glycol. The reel allows the hoses to be uncoiled and moved to wherever they are needed.

The Heating Process

Before starting the prime mover 10, the operator should determine at what position the glycol/air valve 80 should be. The unit is then started and allowed to warm up to a predetermined temperature. The prime mover 10 is then sped up to maximum power and rpm. At this time, the fluid heater 70 starts to generate heat.

There are four sources of heat in this process. The first source is the fluid heater 70, the second is the intercooler 20, the third is the engine coolant heat exchanger portions 60, 140 and the fourth is the engine exhaust heat exchanger 130.

The glycol to be heated is pumped from the glycol reservoir 40 along pipeline 42 to the glycol pump 50 and then along pipeline 52 to the engine coolant heat exchanger portion 60. Heat is transferred at the engine coolant heat exchanger portion 140 from the hot engine coolant circulating therethrough to the glycol in exchanger portion 60. The engine coolant is continuously pumped along pipelines 142, 144 by its own engine coolant pump for transfer of heat to heat exchanger portion 60.

The glycol is then pumped from this exchanger portion 60 to the fluid shear heater 70 along pipeline 62, where the glycol is heated from the internal friction and shearing in the heater 70. After leaving the fluid shear heater 70, the glycol is pumped to the glycol/air valve 80 along pipeline 72. The glycol is sent to either the glycol hose 90 by pipeline 82, or to the radiator 30 by pipeline 84, or a combination of both, depending on a position of a valve lever or a positioning of the valve 80 as selected by the operator.

If 100% glycol is selected by the operator at the glycol/air valve 80 then all of the glycol will be directed to the hose 90 by pipeline 82 for release of heat shown at 120. The cooled glycol is returned along pipeline 92 to the glycol reservoir 40. The process to heat the glycol is then repeated.

The only heat to be output as air will be from the intercooler 20, the radiator 30 and the exhaust heat exchanger 130 moving in the direction of arrow 32. Hot air is drawn off in the direction of arrow 32 by fan 100 (driven by shaft 102 off of drive shaft 12). Heated air is exhausted through external duct work in the direction of arrow 110.

If the operator selects 100% air on the glycol/air valve 80 then all of the glycol flow will be sent to the radiator 30 along pipeline 84, resulting in all of the heat generated from the heated glycol to be output as heated air. The heated air is drawn off by fan 100 in the direction of arrow 32 to the duct 110. The cooled glycol is returned to glycol reservoir 40 by pipe 34.

Any position other than the above two in the valve 80 will result in partial proportional flow to either the hose 90 or the radiator 30. The amount of heated glycol compared to heated air is thereby controlled.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A flameless combination heater for heating air and a heater fluid, said flameless combination heater comprising:
   a prime mover, said prime mover comprising circulating engine coolant and engine exhaust;
   a heater fluid system, said heater fluid system comprising heater fluid, a first heat exchanger configured to transfer heat from the engine coolant to the heater fluid and a second heat exchanger configured to heat the heater fluid, said second heat exchanger driven by the prime mover;
   an air moving system for moving heated air, said air moving system comprising a fan and a third heat exchanger; and
   a three-way variable valve configured to control distribution of relative amounts of heated heater fluid to at least one of a heating fluid hose and the third heat exchanger, wherein
   the amount of heated heater fluid sent to the fluid hose and the third heat exchanger is determined based on a predetermined position of the three-way variable valve, and
   if the predetermined position is set such that all the heater fluid is sent to the third heat exchanger, then substantially all of the heat generated from the heated fluid is output from said flameless combination heater as heated air.

2. The flameless combination heater according to claim 1, wherein the air moving system comprises a fourth heat exchanger for removal of heat from the engine exhaust.

3. The flameless combination heater according to claim 1, comprising an air intercooler configured to cool compressed air received from the prime mover and then return the cooled air to the prime mover.

4. The flameless combination heater according to claim 1, wherein the heating fluid hose is mounted on a reel and capable of transporting hot glycol.

5. The flameless combination heater according to claim 1, wherein the third heat exchanger is a liquid to air heat exchanger.

6. The flameless combination heater according to claim 1, wherein the heater fluid is glycol.

7. The flameless combination heater according to claim 3, wherein the fan is positioned relative to the second, the third and the fourth heat exchanger for removal of heated air in a specified direction.

8. The flameless combination heater according to claim 7 wherein the fan is positioned downstream of the heat exchangers, and the heated air is directed to a heat duct and exhausted through the heat duct.

9. The flameless combination heater according to claim 1, wherein a heater fluid pump and said fan are driven by said prime mover.

10. The flameless combination heater according to claim 1, wherein the third heat exchanger comprises a radiator of the prime mover.

11. A flameless combination heater for heating air and a heater fluid, said flameless combination heater comprising:
 a prime mover, said prime mover including circulating engine coolant and engine exhaust;
 a heater fluid system, said heater fluid system comprising heater fluid, a heater fluid pump, a heater fluid reservoir, a first heat exchanger for transferring heat from the engine coolant to the heater fluid and a dynamic heater for heating the heater fluid, said dynamic heater and said heater fluid pump driven by the prime mover;
 an air moving system configured to move heated air, said air moving system comprising a fan and a second to air heat exchanger, said fan driven by the prime mover; and
 a three way variable valve configured to control distribution of relative amounts of heated heater fluid and the heated air by controlling distribution of the heated heater fluid,
 wherein the heated heater fluid is directed to at least one of a heating fluid hose and the second heat exchanger, the amount of heated heater fluid directed to the heating fluid hose and the second heat exchanger is determined based on a predetermined position of the three-way variable valve, and
 if the predetermined position is set such that all the heater fluid is sent to the second heat exchanger, then substantially all of the heat generated from the heated fluid is output from said flameless combination heater as heated air.

12. The flameless combination heater according to claim 11, wherein the air moving system comprises a third heat exchanger for removal of heat from the engine exhaust.

13. The flameless combination heater according to claim 12, wherein the air moving system comprises a fourth heat exchanger for removal of heat by an air intercooler.

14. The flameless combination heater according to claim 11, wherein the second heat exchanger is a liquid to air heat exchanger.

15. The flameless combination heater according to claim 11, wherein the heater fluid is glycol.

16. The flameless combination heater according to claim 13, wherein the fan is positioned relative to the second, the third and the fourth heat exchanger for removal of heated air in a specified direction.

17. The flameless combination heater according to claim 16, wherein the fan is positioned downstream of the heat exchangers.

18. The flameless combination heater according to claim 11, wherein the second heat exchanger is a radiator of the prime mover.

19. The flameless combination heater according to claim 1, wherein the heat distributed by said flameless combination heater is generated by the heated heater fluid, the heated air, or a combination of the heated heater fluid and the heated air.

20. The flameless combination heater according to claim 11, wherein the heat distributed by said flameless combination heater is generated by the heated heater fluid, the heated air, or a combination of the heated heater fluid and the heated air.

* * * * *